(12) United States Patent
Cherry (10) Patent No.: US 6,523,619 B1
(45) Date of Patent: Feb. 25, 2003

(54) DIRT GRADING IMPLEMENT

(76) Inventor: Robert Cherry, 14866 51st. Rd., Winfield, KS (US) 67156

( * ) Notice: Subject to any disclaimer, the term of this patent is extended or adjusted under 35 U.S.C. 154(b) by 0 days.

(21) Appl. No.: 09/714,655

(22) Filed: Nov. 16, 2000

(51) Int. Cl.[7] ............................................. A01B 31/00
(52) U.S. Cl. ................... 172/684.5; 404/118
(58) Field of Search ......................... 37/281, 274, 266, 37/407; 172/781, 783, 799.5, 681, 684.5, 701.1, 719, 701.3, 817; 404/113, 118

(56) References Cited

U.S. PATENT DOCUMENTS

| | | | | |
|---|---|---|---|---|
| 3,440,744 A | * | 4/1969 | Smith | 37/407 |
| 3,845,517 A | * | 11/1974 | Harris | 15/93 B |
| 3,901,618 A | * | 8/1975 | Sant'Agata | 404/118 |
| 4,009,529 A | * | 3/1977 | Johnson | 37/117.5 |
| 4,141,160 A | * | 2/1979 | Olson | 37/141 |
| 4,360,980 A | * | 11/1982 | Jarvis | 37/117.5 |
| 4,809,449 A | * | 3/1989 | Solaja | 37/117.5 |
| 4,815,542 A | * | 3/1989 | DePlazes | 172/243 |
| 5,411,102 A | * | 5/1995 | Nickels et al. | 172/781 |
| 5,497,569 A | * | 3/1996 | Byman | 37/410 |
| 5,671,553 A | * | 9/1997 | Burkhart | 37/270 |
| 5,701,693 A | * | 12/1997 | Brocious et al. | 37/381 |
| 5,718,295 A | * | 2/1998 | Trahan | 172/26.5 |
| 5,909,981 A | * | 6/1999 | Neuber, Jr. | 404/112 |
| 5,918,389 A | * | 7/1999 | Hall | 37/407 |
| 5,988,295 A | * | 11/1999 | Goulet | 172/810 |
| 6,019,544 A | * | 2/2000 | Emerson et al. | 404/104 |
| 6,085,848 A | * | 7/2000 | Sanders | 172/684.5 |
| 6,088,938 A | * | 7/2000 | Logan | 37/468 |
| 6,243,975 B1 | * | 6/2001 | Galll | 37/407 |
| 6,283,225 B1 | * | 9/2001 | Hermonson | 172/817 |
| 6,315,056 B1 | * | 11/2001 | Ransom et al. | 172/684.5 |
| 6,318,477 B1 | * | 11/2001 | Bettin | 172/452 |

* cited by examiner

*Primary Examiner*—Thomas B. Will
*Assistant Examiner*—Kristine Markovich
(74) *Attorney, Agent, or Firm*—Kenneth Jack (57) ABSTRACT

A dirt grading implement consisting of a mounting plate having a front side, a back side, a left side, a right side, and having a lower end, the back side of the mounting plate being adapted for removable attachment to the boom arm or lift arms of mobile earth moving equipment; a bar fixedly attached to the lower end of the mounting plate, the bar having a leftwardly extending section and a rightwardly extending section, the sections extending respectively leftwardly and rightwardly from the left and right sides of the mounting plate, the bar having a forwardly oriented face and a downwardly oriented dirt engaging face.

9 Claims, 6 Drawing Sheets

DIRT GRADING IMPLEMENT

FIELD OF THE INVENTION

This invention relates to dirt working or dirt grading implements. More particularly, this invention relates to such implements adapted for removable attachment to the lift arms of a skid steer loader or a front loader tractor, to the boom arm of an excavator or tractor backhoe, or to a rear three point hitch of a tractor.

BACKGROUND OF THE INVENTION

The curtilage of a newly constructed house or commercial building typically comprises rough bare ground having tire ruts and dirt mounds. Typically, a final step in construction of such new home or commercial building includes filling ruts, smoothing the ground, and leveling dirt mounds so that the ground has proper drainage away from the building, and so that the ground is ready for landscaping and lawn planting. This stage of construction is commonly referred to as "final grading."

Items of heavy mobile construction equipment which a building contractor typically has available for performing final grading include tractors having a rear three point implement hitch, skid steer loaders or front loader tractors having articulating paired lift arms, and tractor backhoes or excavators having a jointed articulating boom arm. A typical earth moving implement attachable to such three point hitch is a box blade, and a typical earth moving implement attachable to such lift arms or boom arm is a dirt moving bucket. While a dirt moving bucket may efficiently move localized piles of earth, and while a box blade may efficiently smooth narrow swaths of ground, neither implement is capable of quickly and efficiently grading an entire curtilage requiring varying earth moving, filling, and smoothing tasks. The deficiencies of such common dirt moving implements are particularly pronounced where the ground to be smoothed includes overlying structures such as fences, box out closets and windows, and patio decks.

The instant inventive dirt grading implement overcomes such deficiencies common to box blades and dirt moving buckets by providing a laterally elongated dirt grading bar having a plurality of differently oriented dirt engaging faces, and having leftwardly and rightwardly extended dirt moving sections.

BRIEF SUMMARY OF THE INVENTION

A preferred embodiment of the instant inventive dirt grading implement comprises a mounting plate and a dirt grading bar, the dirt grading bar being fixedly attached to a lower end of the mounting plate. Necessarily, the dirt grading bar has leftwardly extending and rightwardly extending sections. Preferably, the dirt grading bar is composed of a length of ballast filled hollow square tubing; such tubing preferably having four dirt engaging faces oriented forwardly, rearwardly, upwardly, and downwardly. Preferably, the junctures of such faces comprise arcuately curved implement deflecting faces for preventing downward gouging motion of the implement as it slides over ground surfaces.

The forward surface of the mounting plate preferably forms a central dirt catching panel; and preferably, the rearward surfaces of the mounting plate are adapted for releaseable attachment to an implement attachment bracket of the type commonly mounted upon the boom arms of tractor backhoes or excavators, or upon the lift arms of front loader tractors or skid steer loaders. Suitably, the rearwardly facing structures of the mounting plate may incorporate pin and device joints for pivotal attachment to such boom arms or lift arms; or alternately, for attachment to a common rear three point hitch of a tractor.

Preferably, left and right dirt catching panels extend upwardly from and are fixedly attached to the left and right extensions of the dirt grading bar, and preferably the left and right ends of the dirt grading bar further extend leftwardly and rightwardly beyond left and right ends of said dirt catching panels.

In an alternate configuration of the present inventive dirt grading implement, removable attaching means interconnect the left and right extensions of the dirt grading bar with a central section of such bar. A preferred removable attaching means comprises slip joints. Numerous other removable attaching means such as bolt and plate attachments, bolt and flange attachments, and bolted or pinned lap joints may be suitably utilized. By configuring the left and right sections of the dirt grading bar so that they are capable of removable attachment, compact storage of the implement may be achieved. A further advantage of such configuration is that left and right sections having different lengths may be conveniently interchanged.

In operation of the instant inventive dirt grading implement, the central section of the implement, along with its overlying dirt catching panel, may be utilized for moving and leveling mounds of dirt. The broad span of the implement may also be utilized for grading and smoothing broad swaths of ground surfaces in either a forward pushing or a back pulling motion. Where ground is in need of smoothing beneath overlying structures such as fences, box out windows, box out closets, and patio decks, the leftwardly extending section or rightwardly extending section of the implement may be utilized for reaching under such structure for ground smoothing.

Accordingly, it is an object of the present invention to provide a dirt grading implement which is removably attachable to the lift arms of a front loader tractor or skid steer loader, to the boom arm of an excavator or tractor backhoe, or to a tractor's rear three point hitch.

It is a further object of the present invention to provide such a dirt grading implement having a dirt grading bar which extends leftwardly and rightwardly from a lower end of a mounting plate, such bar being capable of grading a broad swath along the ground, and being capable of grading ground surfaces beneath overlying structures.

Other and further objects, benefits, and advantages of the present invention will become known to those skilled in the art upon review of the Detailed Description which follows, and upon review of the appended drawings.

DETAILED DESCRIPTION OF PREFERRED EMBODIMENTS

Figure 1:
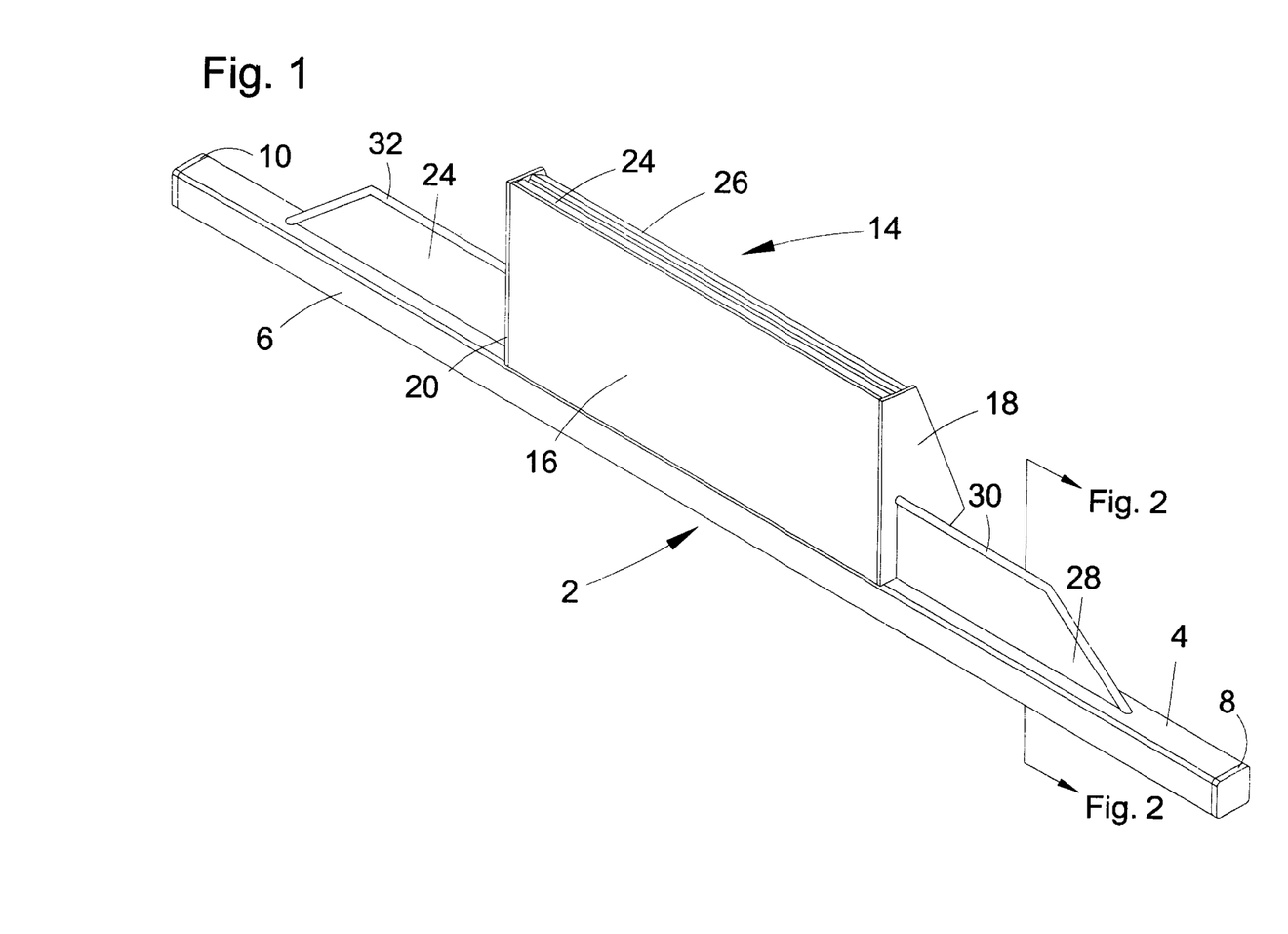
FIG. 1 is an isometric view of the instant inventive dirt grading implement.

Referring now to the drawings, and in particular to FIG. 1, two major structural components of the instant inventive dirt grading implement are a dirt grading bar, referred to generally by reference arrow 2, and a mounting plate, referred to generally by reference arrow 14.

Figure 2:
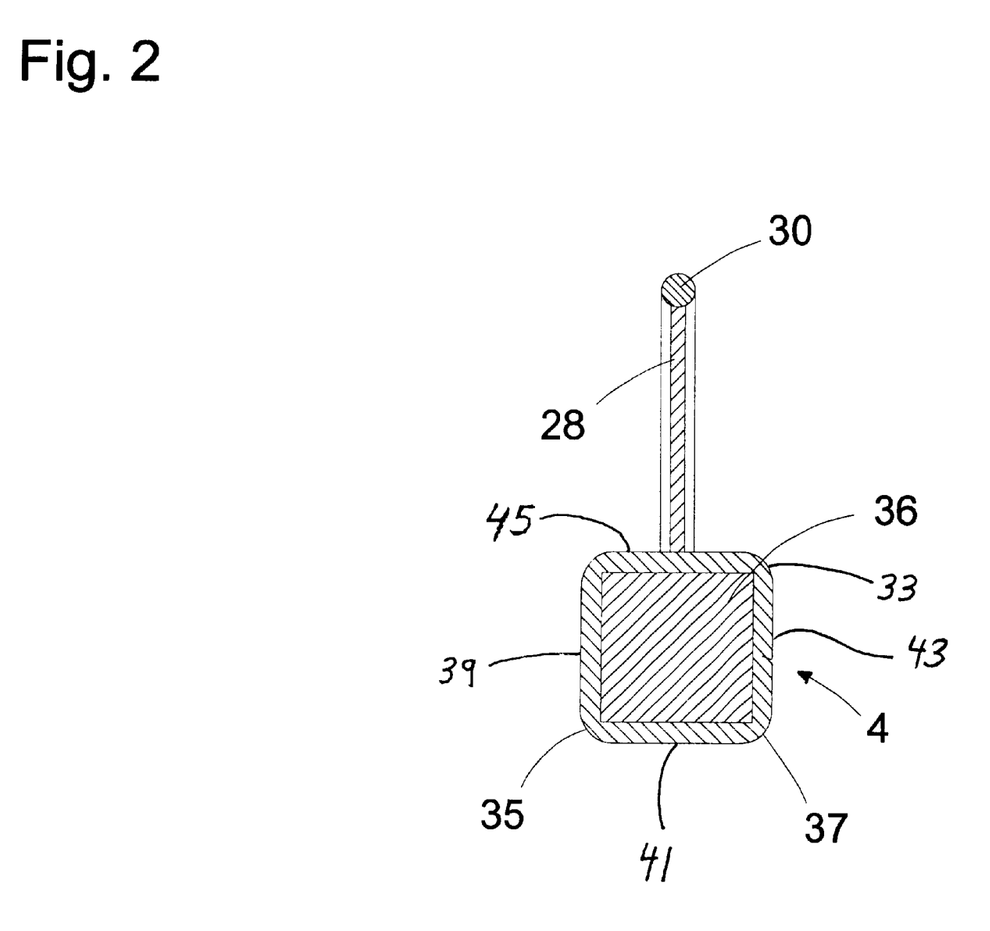
FIG. 2 is a sectional view of the instant inventive dirt grading implement, as indicated in FIG. 1.

Referring simultaneously to FIGS. 1 and 2, the mounting plate 14 preferably comprises a left side plate 18 and a right side plate 20, the left and right side plates 18 and 20 having inwardly facing surfaces rigidly interconnected by five laterally extending members; they being a forward dirt catching panel 16, a rearward dirt catching panel 38, an upper brace 24, a mounting bracket engaging flange 26, and a bolt receiving flange 40. Preferably, all of the joints between side panels 18 and 20 and laterally spanning members 16, 38, 24, 26, and 40 are butt-welded. The rearward dirt catching panel 38 in combination with the upper mounting bracket engaging flange 26 and lower bolt receiving flange 40 are preferably configured for convenient and secure removable attachment to an implement mounting bracket of the type commonly mounted upon the lift arms of a skid steer loader or front loader tractor. Such implement mounting brackets typically have upwardly oriented ridges adapted for engaging implement attaching structures such as the mounting bracket engaging flange 26. Such implement mounting brackets also typically have left and right downwardly extendable and retractable bolts which are adapted for engaging with structures such as left and right bolt receiving apertures 42 and 44, which extend through the lower bolt receiving flange 40.

Figure 3:
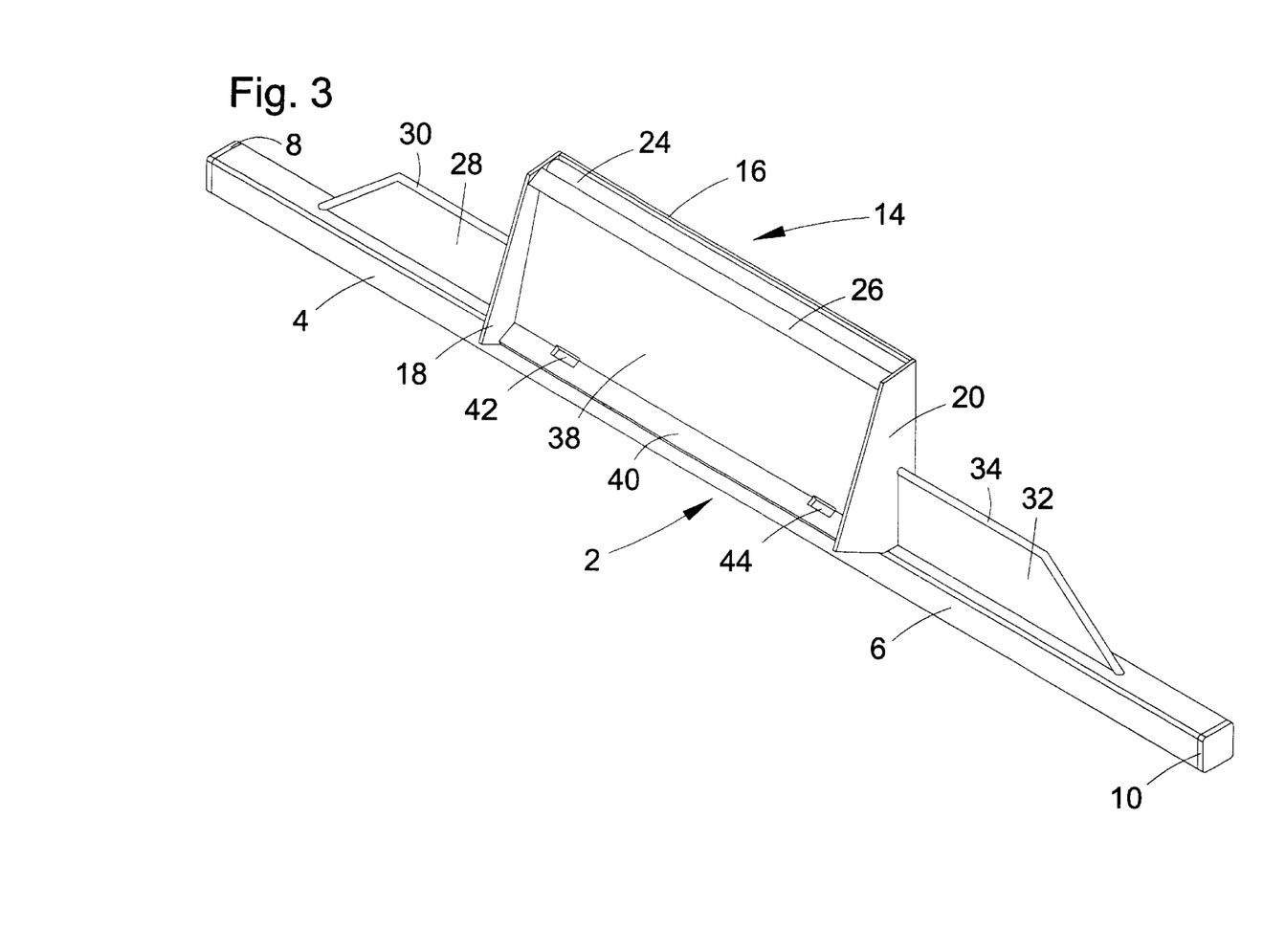
FIG. 3 is an opposite isometric view of the dirt grading implement depicted in FIG. 1.

Referring further to FIG. 3, where the lift arms of a skid steer loader or front loader tractor to which the inventive dirt grading implement is to be attached do not carry an implement mounting bracket such as is described above, the rearward surfaces of mounting plate 14 may be suitably alternately configured to include a pair of upper pin and device joints (not depicted) for direct pivotal attachment to the ends of the bucket rams of the lift arms, and to include a pair of lower pin and device joints (not depicted) for pivotal attachment to said lift arms. Alternately, such pin and device joints may be suitably arranged for attachment to the boom arm and bucket ram of a tractor backhoe or excavator. Also alternately, such pin and device joints may be arranged for attachment to the rear three point hitch of a common tractor.

Referring further simultaneously to FIGS. 1 and 3, the dirt grading bar 2 is preferably fixedly attached to lower surfaces of the mounting plate 4. Preferably, the dirt grading bar 2 is fabricated from a length of square steel tubing having rounded faces at the junctures of its planar faces. Alternately, the dirt grading bar 2 may be fabricated from a length of solid steel bar stock, with corners rounded. Where the dirt grading bar 2 is fabricated from square tubing, it is preferable that its left and right ends be closed by left and right caps 8 and 10.

Referring simultaneously to FIGS. 1, 2, and 3, the lower edge of the forward dirt catching panel 16 is preferably buttwelded onto the upwardly oriented face 45 of dirt grading bar 2, the forward dirt catching panel 16 being positioned with respect to the forwardly oriented face 43 of dirt grading bar 2 to form a substantially continuous dirt catching and moving surface. Also preferably, the lower surfaces of left and right side plates 18 and 20 are butt-welded onto the upwardly oriented face 45 of dirt grading bar 2. Also preferably, the lower edge of the rearward dirt catching panel 38 is butt-welded upon the upwardly oriented face 45 of the dirt grading bar 2. Said four butt-welded attachments of the forward dirt catching panel 16, side plates 18 and 20, and rearward dirt catching panel 38 to the dirt grading bar 2 provide for secure attachment of the mounting plate 14 to the dirt grading bar 2, and prevent dirt and debris from entering the internal spaces of the mounting plate 14.

Referring to FIG. 1, it is preferable that the seams between the upper end of the forward dirt catching panel 16, the brace 24, and the upper end of the rearward dirt catching panel 38 be welded for additional structural integrity, and for prevention of passage of dirt and debris into the internal spaces of the mounting plate 14.

Referring simultaneously to FIGS. 1, 2, and 3, the dirt grading bar 2 necessarily comprises a leftwardly extending section 4 and a rightwardly extending section 6, such left and right sections broadening the dirt smoothing swath of which the dirt grading implement is capable. Preferably, right and left dirt catching panels 24 and 28 are respectively fixedly welded to the upwardly oriented faces 45 of the rightwardly extending and leftwardly extending sections 6 and 4 of the dirt grading bar 2. Also preferably, right and left reinforcement bars 32 and 30 are fixedly welded to the respective upper edges of the right dirt catching panel 24 and the left dirt catching panel 28, such reinforcement bars providing additional structural rigidity to such panels.

Further referring simultaneously to FIGS. 1, 2 and 3, the dirt grading bar 2 preferably is configured to form a series of functional faces; they being arcuately curved implement deflecting faces 33, 35, and 37, a rearwardly oriented dirt engaging face 39, a downwardly oriented dirt engaging face 41, the forwardly oriented dirt engaging face 43, and the upwardly oriented dirt engaging face 45. Referring simultaneously to FIGS. 1 and 2, while the dirt grading implement is vertically oriented, as depicted, the downwardly oriented dirt engaging face 41 may be driven slidably along the ground while the forwardly oriented dirt engaging face 43 accumulates and carries loose dirt thereover, smoothing the ground surface. In the event an area of hardened dirt is encountered while such sliding motion and dirt carrying occurs, the arcuately curved implement deflecting face 37 serves to deflect the entire dirt grading implement upward instead of allowing the implement to gouge downwardly. Alternately, while the dirt grading implement is vertically oriented, its direction of travel may be reversed, causing the downwardly oriented dirt engaging face 41 to slide rearwardly along the ground surface while the rearwardly oriented dirt engaging face 39 collects and carries loose earth rearwardly. Upon such rearward motion, the arcuately curved implement deflecting face 35 functions to deflect the implement upward upon, preventing downward gouging upon encountering hard material.

Referring further simultaneously to FIGS. 1, 2, and 3, where the dirt grading implement is attached to the lift arms of a skid steer loader or front loader tractor, or to the boom arm of a tractor backhoe or excavator, hydraulic bucket articulating rams typical in such vehicles may be actuated to forwardly and downwardly pivot the dirt grading implement, downwardly re-orienting its normally forwardly oriented dirt engaging face 43. While the dirt grading implement is so oriented, the forwardly oriented dirt engaging face 43 serves as slide surface while the normally downwardly oriented dirt engaging face 41 and the normally upwardly oriented dirt engaging face 45 alternately serve, upon alternate rearward and forward sliding motion, as dirt carrying faces. In such orientation, the arcuately curved implement deflecting faces 36 and 37 alternately function to promote upward deflection of the implement rather than downward gouging.

Referring further simultaneously to FIGS. 1 and 3, while the dirt grading implement is oriented as depicted, the lengths of the rightwardly and leftwardly extending sections 6 and 4 of the dirt grading bar 2 which extend beyond the outer ends of the right and left dirt catching panels 24 and 28, may be utilized for grading of ground surfaces which underlie obstructions such as fences, box-out windows and decks. Forward rotation of the dirt grading implement through actuation of bucket rams as described above enhances the lateral reach of the leftward and rightward extensions 6 and 4 of the dirt grading bar by horizontally orienting the right and left dirt catching panels 24 and 28. Horizontal orientation of such panels reduces the overall vertical profile of the rightwardly extending and leftwardly extending sections 6 and 4 of the dirt grading bar, preventing the dirt catching panels from contacting overlying structures.

Referring simultaneously to FIGS. 1 and 2, and assuming that the dirt grading bar 2 is fabricated from square tubing, the interior bore of such tubing may be advantageously filled with ballast 36. Suitably, the ballast 36 may comprise a closely fitted steel bar fixedly welded within the bore of the dirt grading bar 2. Preferably, ballast 36 is situated within the bore of dirt grading bar 2 at such bar's left and right ends, the ballast 36 extending inwardly from such ends. Such ballast 36 serves the function of damping or minimizing vibratory motion or bouncing of the implement as it performs dirt grading.

Figure 4:
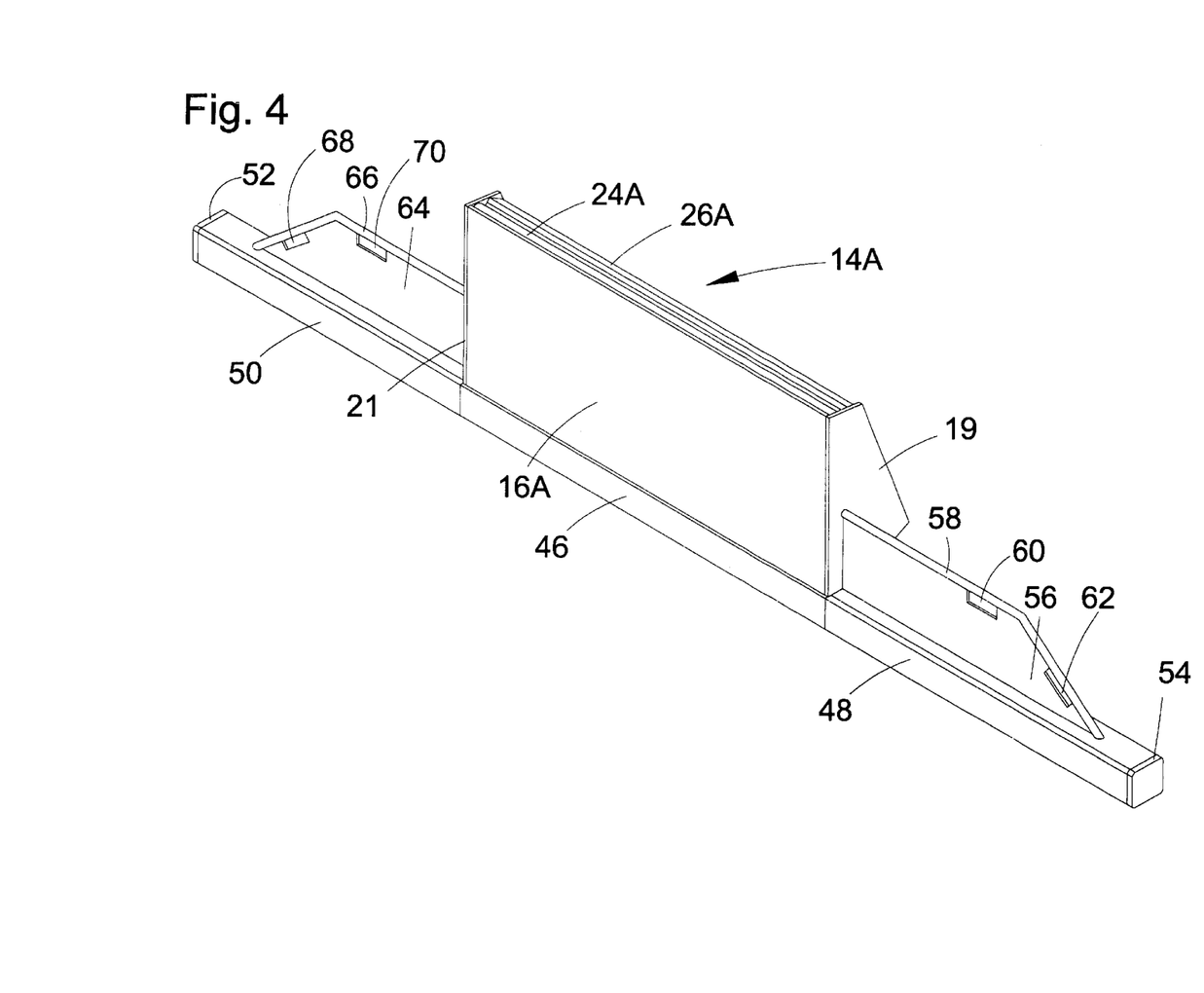
FIG. 4 is an isometric view of an alternate configuration of the dirt grading implement.
Figure 5:
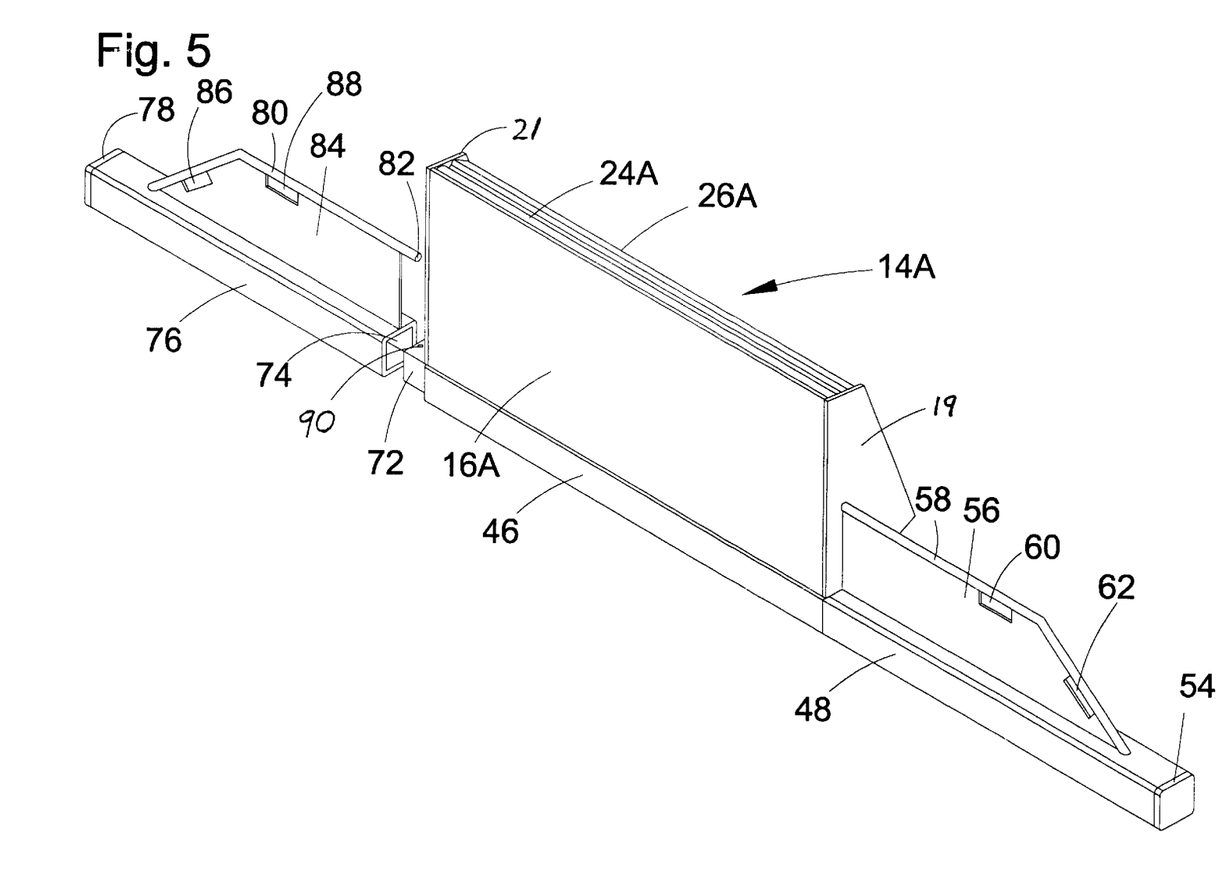
FIG. 5 depicts the implement of FIG. 4 in a partially disassembled configuration.
Figure 6:
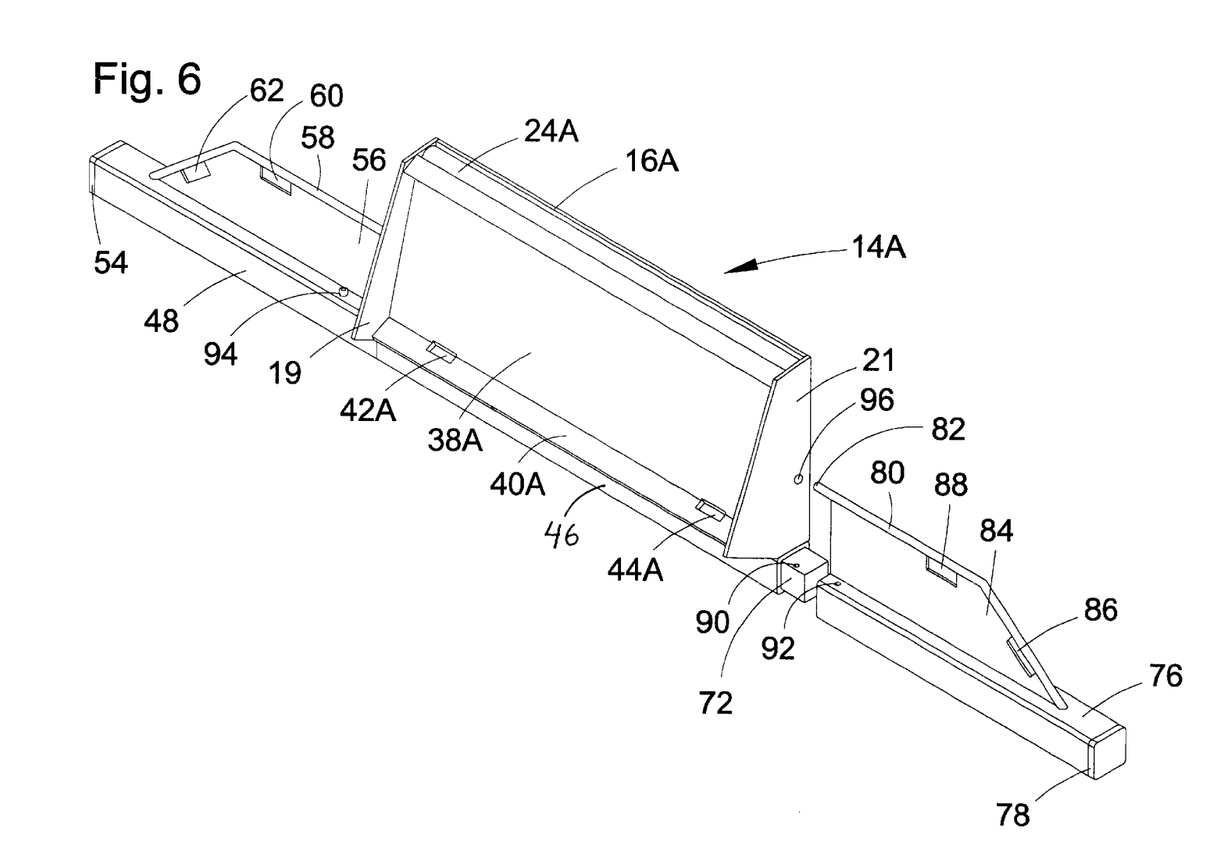
FIG. 6 is an opposite view of the implement depicted in FIG. 5.

FIGS. 4, 5 and 6 depict an alternate configuration of the present inventive dirt grading implement wherein its leftwardly and rightwardly extending sections are removably attached and are interchangeable. Reference numerals in FIGS. 4, 5, and 6 having the suffix "A" are substantially identical to similarly numbered structures in FIGS. 1, 2, and 3. The dirt grading bar of the alternate configuration depicted in FIGS. 4, 5, and 6 consists of a central section 46, a removably attached left section 48, and a removably attached right section 50. Like the left and right ends of the dirt grading bar 2 depicted in FIG. 1, the ends of the left and right sections 48 and 50 preferably are covered by caps 52 and 54. Also, similarly with the left and right dirt catching panels 24 and 28 depicted in FIG. 1, left and right dirt catching panels 56 and 64 are fixedly attached to the left and right sections 48 and 50. The left and right dirt catching panels 56 and 64 are preferably reinforced by bars 58 and 66, such bars forming an integral part of hand holds 60, 62, 68, and 70.

Referring to FIG. 6, in order to remove left section 48 from central section 46, sheer pin 94 is upwardly withdrawn. Alternately and suitably, a spirally threaded bolt (not depicted) extending into a spirally threaded aperture (not depicted) may serve as a substitute for sheer pin 94. Upon removal of sheer pin 94, the left section 48 along with its dirt catching panel 56 may be slidably moved leftwardly, away from left side plate 19 of mounting plate 14A. The removably attachable linkage between left section 48, left side plate 19, and center bar section 46 preferably mirrors the removably attachable linkage between right section 76, right side plate 21, and center bar section 46; such linkage preferably comprising pin and sleeve slip joints; such slip joints preferably comprising pins 72 and 82 and, referring simultaneously to FIGS. 5 and 6, pin receiving sleeves or apertures 74 and 96.

Referring again to FIG. 6, upon slidable positioning of right section 76 over pin 72, a sheer pin similar to sheer pin 94 may be slidably extended through aligned sheer pin receiving apertures 90 and 92, locking right section 76 in place as a rightward lateral extension of central section 46.

The removably attachable left and right sections 48 and 76 depicted in FIGS. 4, 5, and 6 allow for compact breakdown storage of the dirt grading implement, and allow different lengths of left and right extensions to be added to or removed from the implement.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A dirt grading implement having a lowermost surface, the dirt grading implement comprising:
   (a) a mounting plate having a front side, a back side, a left side, a right side, and having a lower end, the back side of the mounting plate being adapted for removable attachment to the lift arms of a skid steer loader, to the lift arm of a front loader tractor, to the boom arm of an excavator or tractor backhoe, or to a rear three point tractor hitch; and,
   (b) a bar fixedly attached to the lower end of the mounting plate, the bar comprising a central section, a leftwardly extending section and a rightwardly extending section, the leftwardly and rightwardly extending sections respectively extending leftwardly and rightwardly from the left and right sides of the mounting plate, the bar having a forwardly oriented dirt engaging face and a downwardly oriented dirt engaging face, the downwardly oriented dirt engaging face comprising the lowermost surface, the bar further having a rearwardly oriented dirt engaging face, the downwardly oriented dirt engaging face spanning between the forwardly oriented dirt engaging face and the rearwardly oriented dirt engaging face, the bar further having a plurality of arcuately curved implement deflecting faces, each implement deflecting face being positioned at a juncture between dirt engaging faces.

2. The dirt grading implement of claim 1 further comprising left and right dirt catching panels fixedly attached to the bar, the left and right dirt catching panels being positioned for resisting a passage of dirt over the leftwardly and rightwardly extending sections of the bar.

3. The dirt grading implement of claim 1 further comprising removable attaching means, the removable attaching means interconnecting the leftwardly extending, central, and rightwardly extending sections of the bar.

4. The dirt grading implement of claim 3 wherein the removable attaching means comprise slip joints.

5. The dirt grading implement of claim 1 wherein the front side of the mounting plate comprises a dirt catching panel.

6. The dirt grading implement of claim 5 wherein the bar comprises a tube having a substantially square cross-sectional shape, the tube defining a hollow interior space.

7. The dirt grading implement of claim 6 further comprising metal ballast mounted within the hollow interior space of the tube.

8. A dirt grading implement having a lowermost surface, the dirt grading implement comprising:
   (a) a mounting plate having a front side, a back side, a left side, a right side, and having a lower end, the back side of the mounting plate being adapted for removable attachment to the lift arms of a skid steer loader, to the lift arm of a front loader tractor, to the boom arm of an excavator or tractor backhoe, or to a rear three point tractor hitch; and, (b) a bar fixedly attached to the lower end of the mounting plate, the bar comprising a central section, a leftwardly extending section and a rightwardly extending section, the leftwardly and rightwardly extending sections respectively extending leftwardly and rightwardly from the left and right sides of the mounting plate, the bar having a forwardly oriented dirt engaging face and a downwardly oriented dirt engaging face, the downwardly oriented dirt engaging face comprising the lowermost surface, the bar further having a rearwardly oriented dirt engaging face, the downwardly oriented dirt engaging face spanning between the forwardly oriented dirt engaging face and the rearwardly oriented dirt engaging face, the bar further having an upwardly oriented dirt engaging face spanning between the forwardly and rearwardly oriented dirt engaging faces, the bar further having a plurality of arcuately curved implement deflecting faces, each implement deflecting face being positioned at a juncture between dirt engaging faces.

9. The dirt grading implement of claim 8 further comprising left and right dirt catching panels fixedly attached to and extending upwardly from the upwardly oriented dirt engaging face of the bar, the left and right dirt catching panels being positioned for resisting passage of dirt over the leftwardly extending and rightwardly extending sections of the bar.

* * * * *